(12) United States Patent
Abdulrahiman et al.

(10) Patent No.: US 9,432,363 B2
(45) Date of Patent: Aug. 30, 2016

(54) SYSTEM AND METHOD FOR USING CREDENTIALS OF A FIRST CLIENT STATION TO AUTHENTICATE A SECOND CLIENT STATION

(71) Applicant: APPLE INC., Cupertino, CA (US)

(72) Inventors: Najeeb M. Abdulrahiman, Cupertino, CA (US); Thomas F. Pauly, Cupertino, CA (US); Vikram B. Yerrabommanahalli, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/502,786

(22) Filed: Sep. 30, 2014

(65) Prior Publication Data

US 2015/0229639 A1    Aug. 13, 2015

Related U.S. Application Data

(60) Provisional application No. 61/937,194, filed on Feb. 7, 2014, provisional application No. 62/005,933, filed on May 30, 2014.

(51) Int. Cl.
| | | |
|---|---|---|
| *H04M 1/66* | (2006.01) | |
| *H04M 1/68* | (2006.01) | |
| *H04M 3/16* | (2006.01) | |
| *H04L 29/06* | (2006.01) | |
| *H04W 12/06* | (2009.01) | |

(52) U.S. Cl.
CPC .......... *H04L 63/0853* (2013.01); *H04W 12/06* (2013.01); *H04L 63/0884* (2013.01); *H04L 63/0892* (2013.01)

(58) Field of Classification Search
None
See application file for complete search history.

(56) References Cited

U.S. PATENT DOCUMENTS

2006/0052085 A1* 3/2006 Rodriguez .......... H04L 12/2859
455/411

2007/0149170 A1* 6/2007 Bloebaum .......... H04L 63/0853
455/411
2009/0221265 A1* 9/2009 Liu ..................... H04L 63/0853
455/411

FOREIGN PATENT DOCUMENTS

| WO | 2008/040120 | 4/2008 |
|---|---|---|
| WO | 2008/060467 | 5/2008 |
| WO | 2012/092604 | 7/2012 |
| WO | 2012/094399 | 7/2012 |

OTHER PUBLICATIONS

Toshiba et al., Having a Single SIM to Authenticate Multiple Devices Simultaneously Using Local Wireless Link, 3GPP SA2 #27 S2-022837, 3GPP, Oct. 14, 2002.

* cited by examiner

*Primary Examiner* — Martin Mushambo
(74) *Attorney, Agent, or Firm* — Fay Kaplun & Marcin, LLP

(57) ABSTRACT

Described are methods that allow credentials of a first client station to authenticate a second client station. An exemplary method includes associating a first client station with a second client station, the first client station including credential information, the associating authorizing the second client station to use the credential information, transmitting, by the second client station, an association request to a network, the network utilizing the credential information to authorize a connection, the second client station configured to perform a proxy functionality for requests received from the network to be forwarded to the first client station and responses received from the first client station to be forwarded to the network, determining, by the network, whether the credential information received from the second client station is authenticated and establishing a connection between the second client station and the network using the credential information of the first client station.

19 Claims, 5 Drawing Sheets

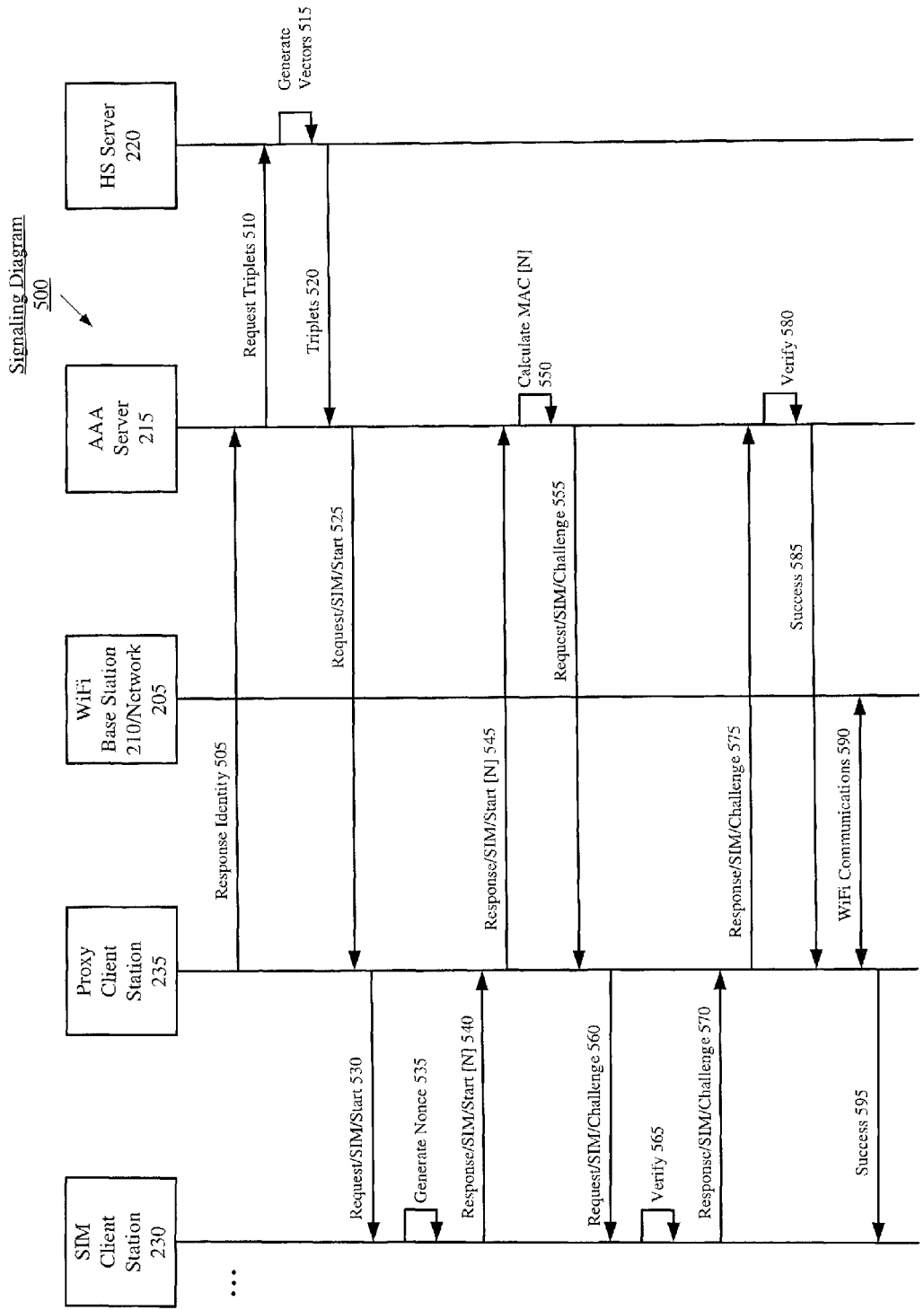

SYSTEM AND METHOD FOR USING CREDENTIALS OF A FIRST CLIENT STATION TO AUTHENTICATE A SECOND CLIENT STATION

INCORPORATION BY REFERENCE/PRIORITY CLAIM

This application claims priority to U.S. Provisional Application Ser. No. 61/937,194 entitled "System and Method for Using Credentials of a First Station to Authenticate a Second Station," filed on Feb. 7, 2014 and U.S. Provisional Application Ser. No. 62/005,933 entitled "System and Method for Using Credentials of a First Station to Authenticate a Second Station," filed on May 30, 2014, both of which are incorporated herein, in their entirety, by reference.

BACKGROUND

A client may be configured to connect to a variety of different networks based upon the hardware and software configurations thereof. For example, the client station may connect to a cellular network when the client station includes a transceiver configured to operate in frequency bands of the cellular network. In another example, the client station may connect to a WiFi network when the client station includes the same transceiver that is further configured to operate in the frequency bands of the WiFi network or a further transceiver configured to operate in the frequency bands of the WiFi network. The WiFi network may be a HotSpot often provided by a cellular service provider. The HotSpot may require an authentication procedure for the client station to connect thereto. For example, a user of the client station may transmit a pre-registered login and password as part of the authentication. A server of the HotSpot may also authenticate the client station using credentials thereof. Specifically, information corresponding to a Subscriber Identity Module (SIM) card of the client station may be used as this information is unique thereto.

SUMMARY

In one exemplary embodiment, a station performs a method. The method includes transmitting an association request to a network, receiving an identification request from the network, transmitting the identification request to a further client station, the further client station including credential information, the client station and the further client station being associated with one another such that the credential information is authorized to be used by the client station, receiving an identification response from the further client station, the identification response being generated as a function of the credential information of the further client station, transmitting the identification response to the network and establishing a connection between the client station and the network using the credential information of the further client station.

In another exemplary embodiment, a client station includes a transceiver and a processor. The transceiver and the processor are configured to establish a connection to a network by transmitting an association request to a network, receiving an identification request from the network, transmitting the identification request to a further client station, the further client station including credential information, the client station and the further client station being associated with one another such that the credential information is authorized to be used by the client station, receiving an identification response from the further client station, the identification response being generated as a function of the credential information of the further client station, transmitting the identification response to the network and establishing a connection between the client station and the network using the credential information of the further client station.

In a further exemplary embodiment, a client station performs a further method. The method includes receiving, from a further client station, an identification request to connect to a network, wherein the identification request is generated by the network, the client station and the further client station being associated with one another such that credential information that is unique to the client station is authorized to be used by the further client station to connect to the network, generating an identification response to the identification request, the identification response being a function of the credential information and transmitting the identification response to the further client station, wherein the identification response is forwarded by the further client station to the network.

In another exemplary embodiment, a method is performed by a first client station, a second client station and a network to which the client stations may connect. The method includes associating a first client station with a second client station, the first client station including credential information that is specific to the first client station, the associating authorizing the second client station to use the credential information, transmitting, by the second client station, an association request to a network, the network utilizing the credential information to authorize a connection thereto, the second client station configured to perform a proxy functionality for requests received from the network to be forwarded to the first client station and responses received from the first client station to be forwarded to the network, determining, by the network, whether the credential information received from the second client station is authenticated and establishing a connection between the second client station and the network using the credential information of the first client station.

BRIEF DESCRIPTION OF THE DRAWINGS

FIG. 5 shows a second exemplary signaling diagram to use credentials of a first client station to authenticate a second client station for connecting to a network.

DETAILED DESCRIPTION

Figure 1:
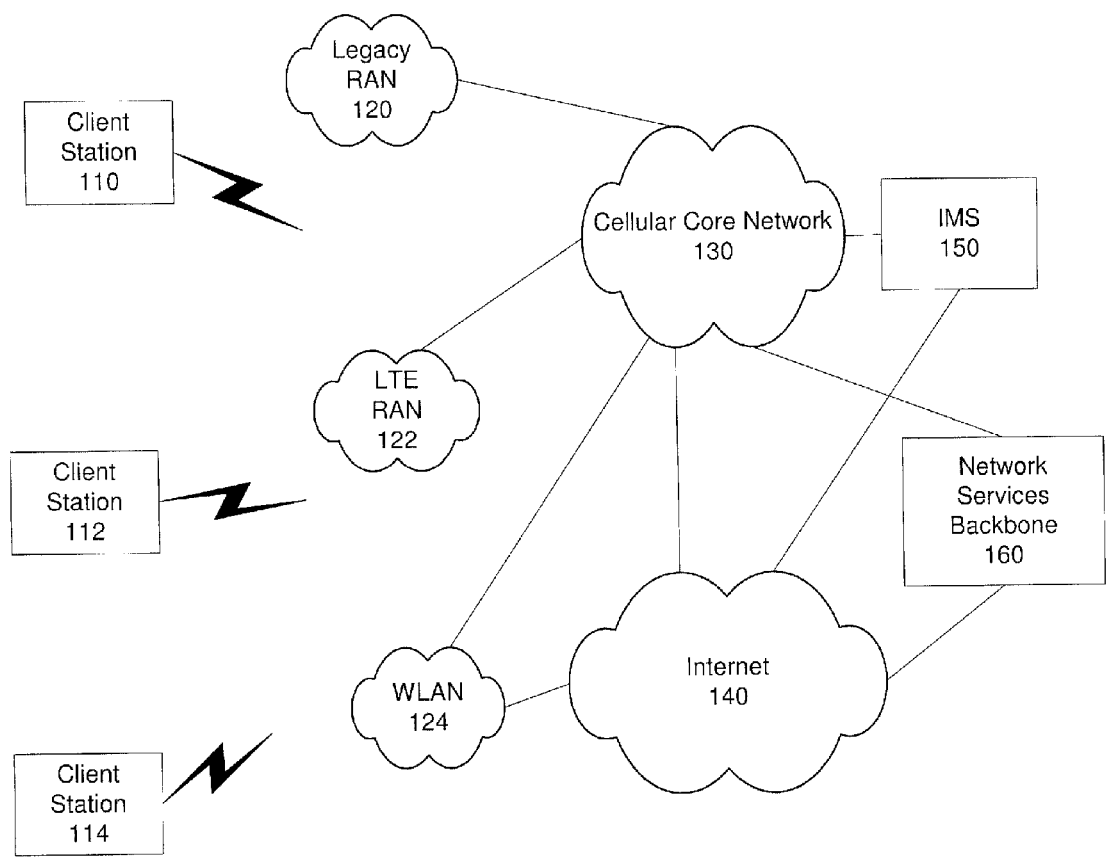
FIG. 1 shows an exemplary network arrangement.

The exemplary embodiments may be further understood with reference to the following description and the related appended drawings, wherein like elements are provided with the same reference numerals. The exemplary embodiments are related to a system and method for using credentials of a first client station to establish a connection to a network by a second client station. Specifically, the first client station may have a SIM card that includes unique credential information that enables the first client station to connect to the network. The exemplary embodiments provide a mechanism for the second client station to act as a proxy device to forward requests and responses between the first client station and the network but ultimately establish the connection between the network and the second client station.

FIG. 1 shows an exemplary network arrangement 100. The exemplary network arrangement 100 includes client stations 110-114. In this example, it is assumed that the client stations 100-114 are associated with a single user. For example, the client station 110 may be the user's mobile phone, the client station 112 may be the user's tablet computer and the client station 114 may be the user's desktop computer. Those skilled in the art will understand that, in addition to the examples provided above, the client stations may be any type of electronic component that is configured to communicate via a network, e.g., smartphones, phablets, embedded devices, etc. It should also be understood that an actual network arrangement may include any number of client stations associated with any number of users and that the user may be associated with more or less client stations. The example of three (3) client stations associated with one (1) user is only provided for illustrative purposes.

Each of the client stations 110-114 may be configured to communicate directly with one or more networks. In this example, the networks with which the client stations 110-114 may communicate are a legacy radio access network (RAN) 120, a Long Term Evolution radio access network (LTE-RAN) network 122 and a wireless local area network (WLAN) 124. In this example, each of the networks 120-124 is a wireless network with which the client stations 110-114 may communicate wirelessly. However, it should be understood that the client stations 110-114 may also communicate with other types of networks using a wired connection. It should also be understood that not all of the client stations 110-114 may communicate directly with each of the networks 120-124. For example, the client station 114 may not have an LTE chipset and therefore may not have the ability to communicate with the LTE-RAN 122. Again, the use of three (3) networks is only exemplary and there may be any other number of networks with which the client stations 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base stations (Node Bs, eNodeBs, HeNBs, etc.) that are configured to send and receive traffic from client stations that are equipped with the appropriate cellular chip set. Examples of the legacy RAN may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the client stations 110-114 to communicate with the WLAN 124.

In addition to the networks 120-124, the network arrangement also includes a cellular core network 130 and the Internet 140. The cellular core network 130, the legacy RAN 120 and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the client stations 110-114 using the IP protocol. The IMS 150 may include a variety of components to accomplish this task. For example, a typical IMS 150 includes an Home Subscriber (HS) server that stores subscription information for a user of the client stations 110-114. This subscription information is used to provide the correct multimedia services to the user. Other exemplary components of the IMS 150 will be described below, as needed. The IMS 150 may communicate with the cellular core network 130 and the Internet 140 to provide the multimedia services to the client stations 110-114. The IMS 150 is shown in close proximity to the cellular core network 130 because the cellular provider typically implements the functionality of the IMS 150. However, it is not necessary for this to be the case. The IMS 150 may be provided by another party.

Thus, the network arrangement 100 allows the client stations 110-114 to perform functionalities generally associated with computer and cellular networks. For example, the client stations 110-114 may perform voice calls to other parties, may browse the Internet 140 for information, may stream multimedia data to the client devices 110-114, etc.

However, as described above, not every client station 110-114 may have the same communication capabilities with the networks 120, 122, 124, 130, 140. This lack of communication with one or more of the networks may be due to the capabilities of the client device 110-114, e.g., the client device does not include a cellular chip, or may be due to a limitation of the network, e.g., a cellular network does not have a base station within range of the client station. This lack of communication with one or more networks may result in the client station being unable to avail itself of the functionalities that are available via one or more of the networks.

In addition to the elements already described, the network arrangement 100 also includes a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the client stations 110-114 in communication with the various networks. These extensions may include the functionalities to which the client device 110-114 does not have access because of limitations of the device and/or network, some examples of which were described above. The network services backbone 160 interacts with the client devices 110-114 and/or the networks 120, 122, 124, 130, 140 to provide these extended functionalities.

The network services backbone 160 may be provided by any entity or a set of entities. In one example, the network services backbone 160 is provided by the supplier of one or more of the client stations 110-114. In another example, the network services backbone 160 is provided by the cellular network provider. In still a further example, the network services backbone 160 is provided by a third party unrelated to the cellular network provider or the supplier of the client stations 110-114.

The exemplary embodiments described herein provide an example of different types of functionalities that may be extended to a client station 110-114 and also provide an example of components and services that may be included in the network services backbone 160. In this example, the network services backbone 160 is used to provide credentials from a first of the client stations 110-114 for a second one of the client stations 110-114 to access a network. However, it should be understood that the network services backbone 160 may include many other components and services that may be used to enhance the operations of the client stations 110-114 and networks.

One of the services provided by the network services backbone 160 may be to store and update associations among the different client stations 110-114. As described above, in this example, each of these client stations 110-114 are associated with the same user. Thus, the network services backbone 160 may store information that indicates this association of the user with each of the client stations 110-114 and may then also store (or link) the relationship of the client stations 110-114 with each other based on their association with the user. This association among client stations 110-114 may be used as one of the bases for the network services backbone 160 to provide the enhanced operations of the client stations 110-114.

A client station (e.g., client stations 110-114) may include a transceiver that is configured to connect to a WiFi network (e.g., as defined by IEEE 802.11a/b/g/n/ac). That is, the transceiver may operate in a frequency range of the WiFi network. As described above, a WiFi network may be a type of WLAN 124. Thus, throughout this description, the term WiFi should be understood to include any type of WLAN. However, the client station may be required to perform an authentication procedure to establish a connection to the WiFi network. Thus, the client station may transmit credential information, user-specified authentication information (e.g., login name and/or password), a combination thereof, etc. for the server of the WiFi network to verify an association request.

In a first example, when the WiFi network is a private local area network (LAN), the authentication procedure may entail selecting the WiFi network (particularly if hidden) and optionally providing a password. When the credential information is transmitted and verified by a server of the private LAN, an association procedure may be performed for the client station to establish the connection to the private LAN.

In a second example and according to the exemplary embodiments, when the WiFi network is a HotSpot, the authentication procedure may also entail providing a login and/or password but may further include providing credentials unique to the client station. Specifically, the information corresponding to the SIM card of the client station may be used. The HotSpot may be provided by a cellular service provider. That is, the cellular service provider may provide various HotSpot locations for the users who have registered with the cellular service provider to have access to these WiFi networks. Accordingly, the client station may connect to the cellular network and WiFi networks that are provided by the cellular service provider. One manner of verifying that the user who is registered with the cellular service provider is also attempting to connect to the HotSpot provided by the cellular service provider is to use the information of the SIM card. However, it is also possible to use some other method of uniquely identifying the client station, e.g., it is not required that the unique identification is information of a SIM card.

In view of the manner in which a client station is authenticated to join the HotSpot, an issue that arises is when the user who is properly registered for use with a first client station attempts to join the HotSpot with a second client station, particularly when the second client station does not have a SIM card or other unique identifying component which may be used by the cellular service provider to verify the authentication. For example, a user may own a first client station that has a cellular capability and is registered with a cellular service provider via a SIM card corresponding to the first client station. The cellular service provider may also provide WiFi networks such as the HotSpot for the user. The user may further own a second client station that does not have a cellular capability but has a WiFi capability. Accordingly, the second client station may not be registered with any cellular service provider, particularly the cellular service provider for the first mobile client station. However, since the second client station has the WiFi capability, the second client station may potentially connect to the HotSpot that utilizes WiFi technology.

When such a scenario exists, the user may wish to use the second client station by connecting to the HotSpot. However, since the credential information corresponding to the SIM card is not available, the second client station may be incapable of connecting to the HotSpot despite the first client station having the proper credential information and both client stations belonging to the same user. Therefore, the user who owns both the first and second client stations is only allowed to connect to the HotSpot using the first client station.

The exemplary embodiments provide a mechanism to pair two or more client stations of a common user to automatically connect to a WiFi network provided by a cellular service provider in which SIM card credentials are used as a basis of authentication for the association request. Specifically, the first client station that has the SIM card may provide its SIM credentials in a secured manner to the second client station that does not have a SIM card (or any other component that includes the credential information of the SIM card of the first client station). The second client station may query the paired first client station to retrieve the SIM card credential information and may also further query the first client station (e.g., challenges) to complete an authentication procedure to connect to the WiFi network.

As will be described in further detail below, the pairing of the first and second client stations may include a proxy functionality for the second client station. Those skilled in the art will understand that in a network environment, a proxy may be an intermediary component configured to receive and forward data between further components. For example, data from a client station may be transmitted to a network server using a proxy server such that the data is first transmitted to the proxy server and forwarded to the network server. The second client station may also include this proxy functionality as well as utilize the data being exchanged therethrough to establish a connection to the WiFi network for itself. Specifically, credential information may be passed from the first client station to the network server along with other data that is used between the first client station and the network server for an association request. However, the second client station may ultimately connect to the WiFi network by using this credential information being passed.

It should be noted that the term "pair" used herein relates to any authorized association between the first and second client stations. For example, the first and second client stations may be owned by a common owner. One manner of indicating the common ownership is a connection to a cloud network using a common login name and password such that a cloud server "pairs" these devices together. As described above, this pairing functionality may be performed by the network services backbone 160. Thus, the cloud server may be included in the network services backbone 160. It should also be noted that the use of the first and second client stations is only exemplary in which the term "pair" corresponds to these to devices. However, those skilled in the art will understand that the exemplary embodiments may relate to more than two client stations having an authorized association.

Figure 2:
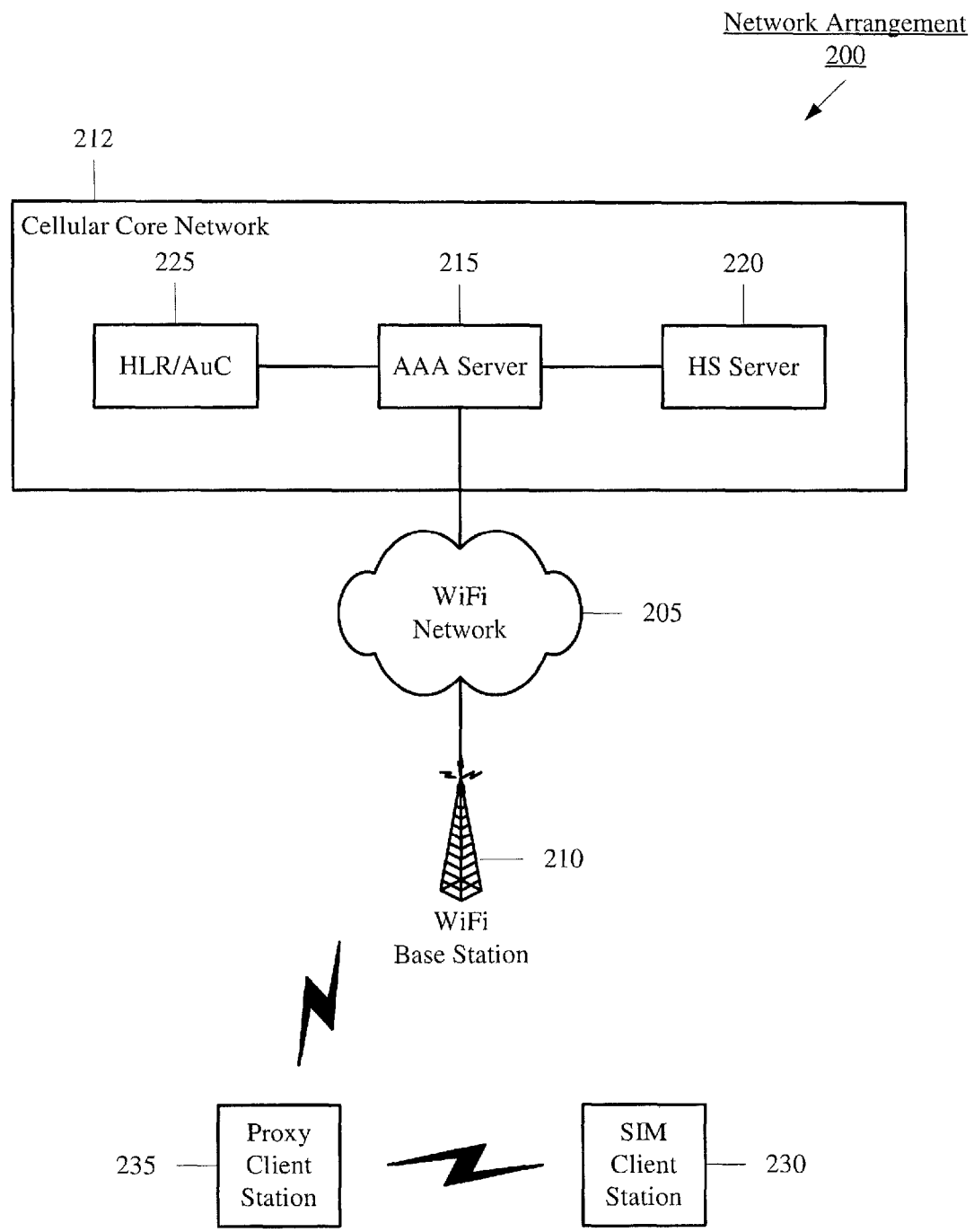
FIG. 2 shows an exemplary network arrangement to use credentials of a first client station to authenticate a second client station for connecting to a network.

FIG. 2 shows an exemplary network arrangement 200 in more detail than the network arrangement 100 of FIG. 1. The network arrangement 200 will be used to describe the use of credentials of a SIM client station 230 to authenticate a proxy client station 235 for connecting to a WiFi network 205. Referring to FIG. 1, the SIM client station 230 and the proxy client station 235 may be any of the client stations 110-114. The WiFi network 205 may be the WLAN 124. The exemplary embodiments relate to an authentication procedure to connect to the WiFi network 205. Thus, the network arrangement 200 may include a variety of different authentication network components associated with a cellular core network 212 such as an Authentication, Authorization, and Accounting (AAA) server 215, a Home Subscriber (HS) server 220, and a Home Location Register (HLR)/Authentication Center (AuC) 225.

As described above, the WiFi network 205 in the network arrangement 200 may represent a HotSpot that utilizes client station-specific credentials to authenticate an association request. However, it should be noted that the use of a HotSpot herein is only exemplary and that the WiFi network 205 utilizing WiFi technology is only exemplary. Those skilled in the art will understand that any network type that utilizes any network technology may include a manner of authentication that utilizes client station-specific information. Also as described above, the client station-specific credentials may be information corresponding to a SIM card of the client station. However, it should be noted that the use of the SIM card is only exemplary and represents any component that includes information that is unique to a client station and/or a user of the client station.

The WiFi network 205 may utilize a variety of different authentication frameworks to authenticate a client station providing an association request for connecting thereto. For example, the WiFi network 205 may utilize an Extensible Authentication Protocol (EAP). The EAP may be an authentication framework used in wireless networks and Point-to-Point connections. The EAP provides an authentication framework that may be used to define message formats for the type of communication protocol being used. In this manner, the device may use EAP to define encapsulation methods for EAP messages in communications using the desired type of protocol. The EAP may be used, for example, in IEEE 802.11 which defines the WiFi network 205. In a specific example, the WiFi Protected Access (WPA) and the WiFi Protected Access II (WPA2) standards have adopted IEEE 802.1X with five EAP types as the official authentication mechanisms.

The AAA server 215 may be a network component used for computer security and performs a AAA functionality. The AAA functionality may be used to control users' access to services such as connecting to the WiFi network 205. The AAA server 215 may also record which resources a user has accessed. The AAA server 215 may provide an authentication functionality to authenticate an identity of the client station. For example, the client station may provide information corresponding to a specific digital identity such as an identifier and the corresponding credentials (e.g., passwords, one-time tokens, digital certificates, digital signatures, phone numbers (calling/called), etc.). The AAA server 215 may also provide an authorization functionality to authorize the client station to perform a given activity. The authorization may be, for example, inherited from the authentication functionality when logging on to an application or service. Other examples of the authorization functionality may be based on different restrictions (e.g., time-of-day restrictions, physical location restrictions, restrictions against multiple access by the same entity or user, etc.). The AAA server 215 may also provide an accounting functionality to track network use for the purpose of capacity and trend analysis, cost allocation, billing, etc. In addition, the accounting functionality may record authentication and authorization attempts/failures, and verify that procedures have been correctly followed based on accounting data.

The HS server 220 may store subscription-related information (e.g., subscriber profiles) used by the IMS 150. The HS server 220 may also authenticate and authorize a user/client station, and may provide location and IP information about the user (i.e., user of the proxy client station 235). The HS server 220 may be substantially similar to the HLR/AuC 225 of the Global System for Mobile Communications (GSM) network. Further operations of the HS server 220 with respect to the authentication and authorization functionalities will be described below.

The HLR/AuC 225 may include the HLR portion and the AuC portion. The AuC may be considered a component of the HLR. Specifically, the AuC is the component that validates a SIM card attempting to connect to the WiFi network 205. The security provided by the AuC may prevent third parties from accessing network subscriber services such as HotSpot access provided to network subscribers. The HLR includes information associated with each subscriber that is authorized to use the GSM network. The information may include the unique identifier of each SIM card issued by the cellular service provider. Once an authentication is determined to be successful by the AuC, the HLR manages the SIM and services provided thereto. The HLR may also generate an encryption key that is subsequently used to encrypt all wireless communications (e.g., voice, SMS, etc.) between the client station and the GSM network. If the authentication fails, then no services are possible for the client station.

It should be noted that the AuC may not engage directly in the authentication process, but instead generates data defined as triplets for a mobile switching center (MSC) to use during the procedure. The AuC and SIM have a shared secret key called a $K_i$ which is securely burned into the SIM during manufacture and is also securely replicated onto the AuC. This $K_i$ is combined with the IMSI to produce a challenge/response for identification purposes and an encryption key called a $K_c$ for use in communications. This particular embodiment will be described in further detail below. Those skilled in the art will understand that the substantially similar functionality provided by the HS server 120 may utilize different signaling components. Specifically, the HS server 220 may utilize quintuplets.

As discussed above, the exemplary embodiments relate to a user who registers a first client station with a cellular service provider who also provides the WiFi network 205 and wishes to connect a second client station to the WiFi network 205. Thus, the SIM client station 230 and the proxy client station 235 may both be associated with a common user. Although not specifically shown as to the mechanism of communication, the SIM client station 230 and the proxy client station 235 may be configured to communicate with each other for data to be passed therebetween. As will be described in further detail below, the proxy client station 235 may initiate an association request with the WiFi network 205. The proxy client station 235 may serve as the receiving point for signaling from the WiFi network 205. The proxy client station 235 may also forward this signaling to the SIM client station 230 and receive data therefrom to be forwarded to the WiFi network 205.

Figure 3:
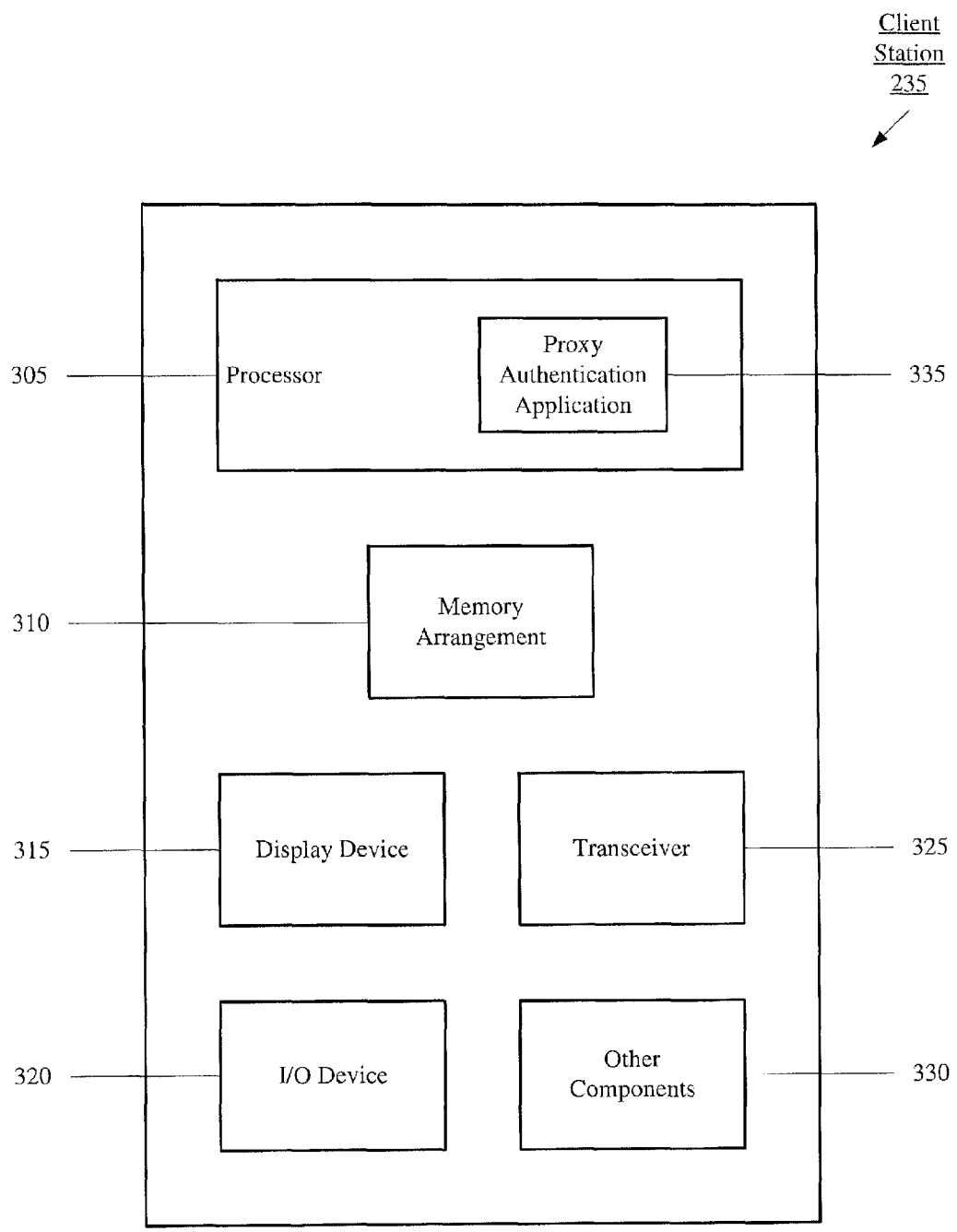
FIG. 3 shows an exemplary client station configured to connect to a network using credentials of a further client station.

FIG. 3 shows the proxy client station 235 configured to connect to the WiFi network 205 using credentials of the SIM client station 230. Although FIG. 2 relates to the proxy client station 235, the SIM client station 230 may also include substantially similar components described herein. Specifically, the SIM client station 230 may include a substantially similar application that is executed to enable the proxy functionality to be performed by the proxy client station 235. The proxy client station 235 may be any electronic device configured to connect to the WiFi network 205 such as a portable device (e.g., a cellular phone, a smartphone, a tablet, a phablet, a laptop, etc.) or a stationary device (e.g., a desktop terminal, a VoIP phone, etc.). The client station 235 may include a processor 305, a memory arrangement 310, a display device 315, an input/output (I/O) device 320, a transceiver 325, and other components 330.

The processor 305 may be configured to execute a plurality of applications of the client station 235. For example, the applications may include a web browser application to exchange data with a public network such as the Internet when connected to the WiFi network 205. In another example, the applications may include a proxy authentication application 335 that performs the proxy authentication functionality in which credential information of the SIM client station 230 is used for authenticating the proxy client station 235 to connect to the WiFi network 205 as will be described in further detail below. It should be noted that the applications being a program executed by the processor 305 is only exemplary. The applications may also be represented as a separate incorporated component of the proxy client station 235 or may be a modular component coupled to the proxy client station 235.

The proxy authentication application 335 may also be included in the SIM client station 230. Specifically, when executed on the SIM client station 230, the proxy authentication application 335 may package the responses of forwarded requests to be securely transmitted to the proxy client station 235. Thus, the proxy client station 235 may forward the requests to the SIM client station 230 but may be aware that the requests are for the authentication procedure according to the exemplary embodiments rather than for an authentication procedure for the SIM client station 230 to connect to the WiFi network 205.

The memory arrangement 310 may be a hardware component configured to store data related to operations performed by the client station 235. For example, the memory arrangement 310 may store cloud data corresponding to a cloud network that the SIM client station 230 and the proxy client station 235 are both associated. In another example, the memory arrangement 310 may also store (temporarily) the data received from the WiFi network 205 and the SIM client station 230 to perform the forwarding functionality in its proxy role. The display device 315 may be a hardware component configured to show data to a user while I/O device 320 may be a hardware component configured to receive inputs from the user and output corresponding data. The other components 330 may include a portable power supply (e.g., battery), a data acquisition device, ports to electrically connect the client station 235 to other electronic devices, an audio I/O device, etc. Specifically, the other components 330 may include the SIM card.

The SIM may be an integrated circuit that securely stores the international mobile subscriber identity (IMSI) and the related key used to identify and authenticate subscribers on mobile telephony devices. A SIM circuit is embedded into a removable plastic card to create a "SIM card" and may be transferred between different mobile devices. The SIM card contains its unique serial number (ICCID), IMSI, security authentication, and ciphering information, temporary information related to the local network, a list of the services the user has access to and passwords such as a personal identification number (PIN) for ordinary use and a personal unblocking code (PUK) for PIN unlocking. In this manner, the SIM card may include a variety of user and/or client station specific credential information that may be utilized by the WiFi network 205 for authentication purposes in an association request.

The transceiver 325 may be a hardware component configured to transmit and/or receive data with the WiFi network 205. The transceiver 325 may also enable a communication with the SIM client station 230. The communication between the proxy client station 235 and the SIM client station 230 may be performed using communication technology. For example, a cloud network may be used in which the cloud network acts as an intermediary storage component for data that is shared between the proxy client station 235 and the SIM client station 230. Accordingly, the transceiver 325 may be utilized for communicating with the cloud network in the operating frequency thereof. In another example, the proxy client station 235 and the SIM client station 230 may establish a direct connection between each other using wired (e.g., Universal Serial Bus (USB) cable) or wireless manners (e.g., BlueTooth, Infrared (IR), etc.). Accordingly, the transceiver 325 may represent a transceiver arrangement that includes the hardware components that enable the communication using the respective manner.

According to the exemplary embodiments, the proxy client station 235 may initiate an association procedure to connect to the WiFi network 205 upon a detection thereof. Again, the proxy client station 235 may not include the credential information that is used to connect the SIM client station 230 to the WiFi network 205. Specifically, the proxy client station 235 may not include the same SIM card used with the SIM client station 230. Therefore, when the user of the proxy client station 235 (and the SIM client station 230) wishes to connect the proxy client station 235 to the WiFi network 205, the exemplary embodiments provide a mechanism for the credential information (e.g., SIM card) of the SIM client station 230 to be used by the proxy client station 235 to authenticate the proxy client station 235. Specifically, after the association procedure is initiated, the proxy client station 235 provides a proxy functionality of signal forwarding until the proxy client station 235 is authenticated and connected to the WiFi network 205. According to the exemplary embodiments, the proxy client station 235 may receive a first request from the WiFi network 205 for identification information and forward this request to the SIM client station 230 to receive the identity response which is transmitted to the WiFi network 105. The proxy client station 235 may also receive a second request from the WiFi network 205 that may be a challenge that only the SIM client station 230 may be configured to correctly respond and forward this request to the SIM client station 230 to receive the challenge answer response which is transmitted to the WiFi network 205. Subsequent acknowledgement signals indicating a success of the connection may also be exchanged.

Figure 4:
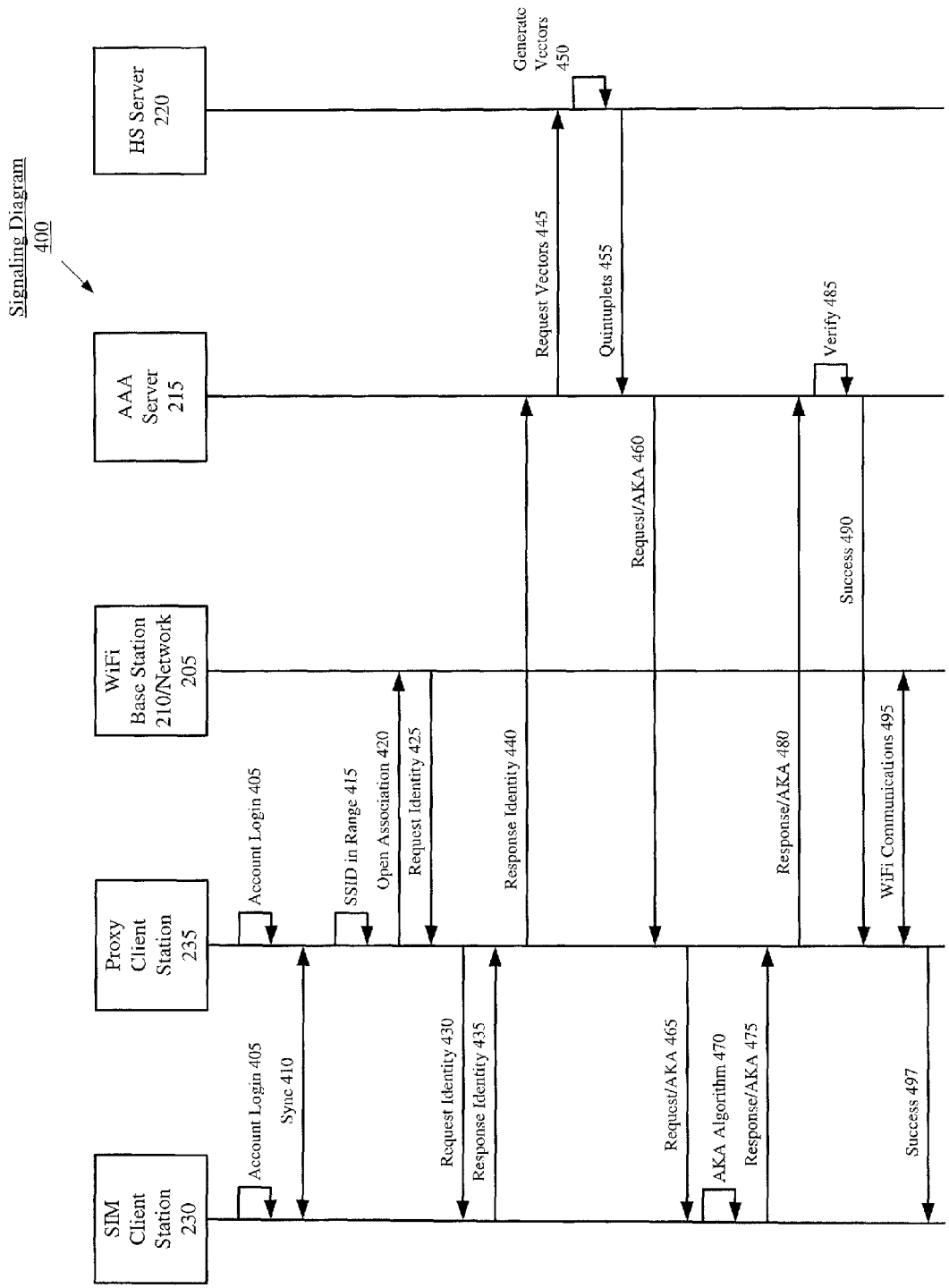
FIG. 4 shows a first exemplary signaling diagram to use credentials of a first client station to authenticate a second client station for connecting to a network.

FIG. 4 shows a first exemplary signaling diagram 400 to use credentials of the SIM client station 230 to authenticate the proxy client station 235 for connecting to the WiFi network 205. Specifically, the signaling diagram 400 relates to when the WiFi network 205 utilizes the AAA server 215 and the HS server 220 to perform the authentication procedure. As discussed above, this may entail the use of quintuplets. As will be described below, this may also entail the use of an Authentication and Key Agreement (AKA) challenge.

The signaling diagram 400 illustrates a variety of different components involved in the authentication procedure according to the exemplary embodiments. As shown, the authentication procedure may involve the SIM client station 230, the proxy client station 235, the WiFi base station 210, the AAA server 215, and the HS server 220. As one skilled in the art will understand, the SIM client station 230 and the proxy client station 235 may include operations performed by a different entity than the operations performed by the WiFi base station 210, the AAA server 215, and the HS server 220. For example, it may be considered that the SIM client station 230 is an iPhone and the proxy client station 235 is an iPod that are supplied by Apple Inc. In such an example, the entity performing various operations therebetween may be network services backbone 160 components managed by Apple Inc. Furthermore, when the WiFi base station 210, the AAA server 215, and the HS server 220 may be network components managed by a cellular service provider such as T-Mobile, AT&T, Verizon, etc.

Initially, the user of the SIM client station 230 and the proxy client station 235 may login 405 into a common account. For example, while running a platform provided by Apple Inc. on both the SIM client station 230 and the proxy client station 235, a cloud network may be accessed such as iCloud or iTunes. Upon connecting to the cloud network, a synchronization functionality 410 may be performed. Specifically, when the SIM client station 230 and/or the proxy client station 235 connect to the cloud network for the first time, the client stations may be paired and associated with the same user. It should be noted that these steps of the signaling diagram may be performed at any time prior to an association request being transmitted from the proxy client station 235. Again, this synchronization functionality may be performed at the network services backbone 160.

The synchronization functionality may also include sharing data related to Service Set Identifications (SSIDs). For example, the SIM client station 230 may have connected to various WiFi networks including the WiFi network 205 in which the SIM credential information is used for authentication. The SIM client station 230 may uplink the SSID information to the cloud network. This SSID information may then be forwarded to the proxy client station 235 to store in the memory arrangement 310. Accordingly, the proxy client station 235 may be aware of WiFi networks in which the SIM credential information is used. Thus, when the proxy client station 235 detects a WiFi network and the SSID matches one of the SSIDs indicative of the SIM credential information use, the proxy client station 235 may be aware that the authentication procedure according to the exemplary embodiments may be used.

The proxy client station 235 may perform a detection procedure to determine available networks. Specifically, the proxy client station 235 may perform a scan in frequency ranges for beacons of the available networks. The frequency ranges may include those in which the transceiver 325 may be configured to operate. The proxy client station 235 may determine, in operation 415, that an SSID of one of the detected networks matches an SSID of a network to which the SIM client station 230 previously connected (e.g., WiFi network 205) based on the list that was synchronized via the cloud network.

Upon detecting the WiFi network 105, the proxy client station 135 may generate an open association request 420 to the WiFi base station 210. The WiFi base station 210 may respond with a request 425 for an identity of the client station that sent the open association request 420. For example, the identity request may be defined using EAP. Since the proxy client station 235 is aware that the SIM credential information has been used for the authentication in the WiFi network 205, the proxy authentication application 335 of the proxy client station 235 may forward the identity request 430 to the SIM client station 230. Throughout this description, the term forward has been used to describe the operation of the proxy client station 235. This term should be understood to mean that the proxy client station 235 transmits the described communication (e.g., identity request 430) in substantially the form the communication was received by the proxy client station 235. However, it should be understood that the proxy client station 235 may format the communication for proper transmission to the receiving device/entity (e.g., if the communication is being sent via the TCP/IP protocol, the proxy client station may add headers and routing information as needed). The forwarding of the identify request from the proxy client station 235 to the SIM client station may be accomplished, as described above, via any known manner of communicating between the client stations.

The SIM client station 230 may receive the identity request 430 and generate the identity response. Specifically, the identity response may correspond to the information included in the SIM card. For example, the identity response may be defined by EAP and include the IMSI. The identity response 435 may be transmitted to the proxy client station 235 which forwards the identity response 440 to the AAA server 215 of the cellular core network 212 via the WiFi network base station 110 and WiFi network 105.

When the AAA server 215 receives the identity response 440 based upon EAP and including the IMSI, the AAA server 215 may request authentication vectors 445 corresponding to the IMSI from the HS server 220. The HS server 220 may generate the authentication vectors 450. As discussed above, the AAA server 215 may also receive the quintuplets corresponding to the authentication vectors to be used subsequently. For example, the quintuplets may include AT_RAND, AT—AUTN, AT_MAC, S-RES, and $K_c$.

Upon receiving the quintuplets 455, the AAA server 215 may generate a request 460 including an AKA challenge based upon the quintuplets. For example, the request/AKA challenge 460 may be defined under EAP. Because the request/AKA challenge 460 is generated based upon quintuplets formed from the IMSI of the SIM card of the SIM client station 230, the correct response may only be generated by the SIM client station 230. Upon generating the request/AKA challenge 460, the AAA server 215 may transmit it to the proxy client station 230. The proxy client station 135 may forward this request/AKA challenge 465 to the SIM client station 230.

The SIM client station 230 may execute an AKA algorithm 470 to generate the response thereto. For example, the AKA algorithm 470 may verify the AUTN and MAC to derive RES and K. This may be included in a response/AKA challenge 475 which includes AT RES and AT_MAC. The response may also be defined under EAP. The response/AKA challenge 475 may be transmitted to the proxy client station 235 which forwards the response/AKA challenge 480 to the AAA server 215. The AAA server 215 may verify 485 the response to complete the authentication procedure. Specifically, the AAA server 215 may transmit an acknowledgement 490 that the authentication procedure was successful. At this point, the proxy client station 235 may be connected to the WiFi network 205 and communications 495 may be conducted between the proxy client station 235 and the WiFi network 205. For completion and to notify the SIM client station 230, the proxy client station 235 may forward the success acknowledgement 497 to the SIM client station 230.

FIG. 5 shows a second exemplary signaling diagram 500 to use credentials of the SIM client station 230 to authenticate the proxy client station 235 for connecting to the WiFi network 205. Specifically, the signaling diagram 500 relates to when the WiFi network 205 utilizes the AAA server 215 and the HLR/AuC 225 to perform the authentication procedure. As discussed above, this may entail the use of triplets. As will be described below, this may also entail the use of a nonce.

Initially, it is noted that the signaling diagram 500 may include an initial set of steps that are substantially similar to the initial set of steps of the signaling diagram 400, e.g., signaling steps 405-435. Thus, the description relating to the signaling diagram 500 begins from the identity response 505 including the IMSI as defined under EAP is forwarded from the proxy client station 135 to the AAA server 115, e.g., a signaling step that corresponds to signaling step 440 of FIG. 4.

As discussed above, when the HLR/AuC 225 is used for authentication, triplets may be used instead of the quintuplets discussed above with regard to the signaling diagram 400 using the HS server 220. Thus, upon the AAA server 215 receiving the response identity 505, the AAA server 215 may request 510 the triplets corresponding to the IMSI of the SIM client station 230 from the HLR/AuC 225. The HLR/AuC 225 may generate 515 the authentication vectors including the triplets and forward 520 the triplets to the AAA server 215.

When the AAA server 215 receives the triplets, the AAA server 215 may generate a request/SIM/Start 525 for transmission to the proxy client station 235. For example, the request/SIM/Start 525 may be defined under EAP. Again, because the proxy client station 235 is aware that the SIM client station 230 has previously connected to the WiFi network 205 utilizing the SIM credential information for authentication, the request/SIM/Start 530 may be forwarded to the SIM client station 230.

When the SIM client station 230 receives the request/SIM/Start 530, the SIM client station 230 may generate a nonce 535. Thus, the SIM client station 230 may generate a response 540 to the request SIM/Start to include the nonce. Specifically, the SIM client station 230 generates the response/SIM/Start 540 (including the nonce [N]) and transmits it to the proxy client station 230 that forwards the response/SIM/Start [N] 545 to the AAA server 215. The AAA server 215 may receive the response/SIM/Start [N] 545 and calculate 550 a MAC using the $K_c$ and nonce. The AAA server 215 may generate a request/SIM/Challenge 555 including the MAC and a RAND (based upon the nonce). This request may also be defined under EAP. The AAA server 215 may generate this request/SIM/Challenge 555 to the proxy client station 235 which forwards the request/SIM/Challenge 560 to the SIM client station 230.

The SIM client station 230 may verify 565 the MAC and execute a GSM algorithm for the RAND to generate a SRES and MAC2. Again, the HLR/AuC may be associated with a GSM network. Upon verifying, the SIM client station 230 may generate a response 570 to the request/SIM/Challenge that includes the MAC2. That is, the SIM client station 230 may generate the response/SIM/Challenge 570 including the MAC2 and defined under EAP. The SIM client station 230 may transmit the response/SIM/Challenge 570 to the proxy client station 235 which forwards 575 the response/SIM/Challenge to the AAA server 215.

When the AAA server 215 receives the response/SIM/Challenge 575 with the MAC2, the AAA server 215 verifies 580 the MAC2 to complete the authentication procedure. Specifically, the AAA server 215 may transmit an acknowledgement 585 that the authentication procedure was successful. At this point, the proxy client station 235 may be connected to the WiFi network 205 and communications 590 may be conducted between the proxy client station 235 and the WiFi network 205. For completion and to notify the SIM client station 230, the proxy client station 135 may forward 595 the success acknowledgement to the SIM client stations 230.

It should be noted that the above signaling diagrams 400, 500 including the various steps is only exemplary. Those skilled in the art will understand that the authentication procedure may include any number of steps. For example, the authentication may only require that the SIM credential information be provided for a connection to the WiFi network 205 without a subsequent challenge. In such an embodiment, the proxy client station 235 may pre-store the SIM credential information of the SIM client station 230 in the memory arrangement 310. Thus, the proxy client station 235 may transmit an association request and receive the identity request from the WiFi network 205 in which the SIM credential information may be forwarded without requiring the SIM client station 230 to be queried.

The exemplary embodiments provide a system and method for using credential information of a first client station to authenticate a second client station such that the second client station may connect to a network that the first client station is allowed to connect to using the credential information. The first and second client stations may be paired such that the second client station is an authorized device that is allowed to utilize the credential information. The first client station may include client station-specific identification information that generates the credential information. The second client station may not have this credential information. Furthermore, the first client station may be the only device configured to correctly respond to a challenge request. That is, the second client station may not respond correctly.

Therefore, the second client station may initiate an association request with the network. After performing this step, the second client station may act as a proxy device that exchanges data between the first client station and the network for the authentication procedure to be performed. When the authentication procedure is completed, the second client station may successfully connect to the network using the credentials of the first client station.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
at a client station:
transmitting an association request to a network;
receiving an identification request from the network;
transmitting the identification request to a further client station, the further client station including credential information, the client station and the further client station being associated with one another such that the credential information is authorized to be used by the client station;
receiving an identification response from the further client station, the identification response being generated as a function of the credential information of the further client station;
transmitting the identification response to the network; and
establishing a connection between the client station and the network using the credential information of the further client station.

2. The method of claim 1, further comprising:
scanning for beacons of available networks, wherein the network is one of the available networks; and
determining the network is a known network for which the credential information is used to connect thereto.

3. The method of claim 2, wherein the determining the network is a known network includes:
comparing a Service Set Identifier (SSID) included in the beacon of the network with stored SSIDs.

4. The method of claim 1, further comprising:
logging into an account that associates the client station with the further client station, wherein the logging into the account authorizes the client station to use the credential information of the further client station; and
receiving information from the account that includes networks for which the credential information is used to connect.

5. The method of claim 4, wherein the account is managed by an entity that is separate from a further entity that manages the network.

6. A client station, comprising:
a transceiver configured to establish a connection to a network; and
a processor;
wherein the processor and the transceiver are configured to establish the connection to the network by:
transmitting an association request to a network;
receiving an identification request from the network;
transmitting the identification request to a further client station, the further client station including credential information, the client station and the further client station being associated with one another such that the credential information is authorized to be used by the client station;
receiving an identification response from the further client station, the identification response being generated as a function of the credential information of the further client station;
transmitting the identification response to the network; and
establishing a connection between the client station and the network using the credential information of the further client station.

7. A method, comprising:
at a client station:
receiving, from a further client station, an identification request to connect to a network, wherein the identification request is generated by the network, the client station and the further client station being associated with one another such that credential information that is unique to the client station is authorized to be used by the further client station to connect to the network;
generating an identification response to the identification request, the identification response being a function of the credential information; and
transmitting the identification response to the further client station, wherein the identification response is forwarded by the further client station to the network.

8. The method of claim 7, further comprising:
receiving, from the further client station, a further request that was generated by the network, wherein the further request includes a request for further information to connect to the network;
generating a response to the further request;
transmitting the response to the further request to the further client station, wherein the response is forwarded by the further client station to the network.

9. The method of claim 8, wherein the further request includes an Authentication and Key Agreement (AKA) challenge and wherein the generating the response includes executing an AKA algorithm.

10. The method of claim 7, wherein the credential information is associated with a Subscriber Identity Module (SIM) card of the client station, wherein the SIM card is associated with a provider of the network.

11. The method of claim 7, further comprising:
transmitting, to an association account, a Service Set Identifier (SSID) of each network to which the client station has connected using the credential information.

12. The method of claim 7, wherein generating the identification response includes generating a nonce that is included in the identification response.

13. A method, comprising:
associating a first client station with a second client station, the first client station including credential information that is specific to the first client station, the associating authorizing the second client station to use the credential information;
transmitting, by the second client station, an association request to a network, the network utilizing the credential information to authorize a connection thereto, the second client station configured to perform a proxy functionality for requests received from the network to be forwarded to the first client station and responses received from the first client station to be forwarded to the network;

determining, by the network, whether the credential information received from the second client station is authenticated; and establishing a connection between the second client station and the network using the credential information of the first client station.

14. The method of claim 13, further comprising:

storing association information between the first client station and the second client station, wherein the association information includes a Service Set Identifier (SSID) of each network to which the first client station has connected using the credential information; and transmitting the association information to the second client station.

15. The method of claim 14, further comprising:

scanning, by the second client station, for beacons of available networks, wherein the network is one of the available networks; and determining, by the second client station, the network is a known network for which the credential information is used to connect thereto by comparing an SSID of the network to the SSIDs in the association information.

16. The method of claim 14, wherein the association information is managed by an entity that is separate from a provider of the network.

17. The method of claim 13, wherein the establishing the connection includes:

generating, by the network, a further request for further information to connect to the network;

transmitting the further request to the second client station;

forwarding the further request to the first client station;

generating, by the first client station, a response to the further request;

transmitting the response to the further request to the second client station;

forwarding the response to the network; and authenticating the response by the network.

18. The method of claim 17, wherein, the further request is an Authentication and Key Agreement (AKA) challenge when the further request is generated by a Home Subscriber (HS) server of the network.

19. The method of claim 17, wherein, the further request is a SIM challenge when the further request is generated by a Home Location Register (HLR)/Authentication Center (AuC) server of the network.

* * * * *